United States Patent [19]
Schmid et al.

[11] Patent Number: 5,123,520
[45] Date of Patent: Jun. 23, 1992

[54] APPARATUS FOR GATHERING AND REMOVING PARTICULATE MATERIAL

[75] Inventors: Leo Schmid, Goslar; Detlef Kühl, Braunschweig, both of Fed. Rep. of Germany

[73] Assignee: Saltzgitter Maschinenbau GmbH, Saltzgitter, Fed. Rep. of Germany

[21] Appl. No.: 637,471

[22] Filed: Jan. 4, 1991

[30] Foreign Application Priority Data

Jan. 5, 1990 [DE] Fed. Rep. of Germany ....... 4000200

[51] Int. Cl.$^5$ .............................................. B65G 65/02
[52] U.S. Cl. .................... 198/514; 198/517; 198/741
[58] Field of Search ............... 198/514, 517, 602, 614, 198/741, 550.12, 550.01, 772; 299/64-67, 43-45, 18, 56

[56] References Cited

U.S. PATENT DOCUMENTS

| | | | |
|---|---|---|---|
| 2,257,181 | 9/1941 | McCarthy | 299/65 |
| 2,543,519 | 2/1951 | Baechli | 198/550.01 X |
| 3,525,446 | 8/1970 | Grafstrom | 198/741 X |
| 3,680,920 | 8/1972 | Amoroso | 198/514 X |
| 4,714,154 | 12/1987 | Harhoff | 198/514 |

FOREIGN PATENT DOCUMENTS

| | | |
|---|---|---|
| 2554274 | 6/1977 | Fed. Rep. of Germany . |
| 3304908 | 8/1984 | Fed. Rep. of Germany . |
| 3546192 | 7/1989 | Fed. Rep. of Germany . |
| 2441567 | 6/1980 | France . |
| 2166403 | 5/1986 | United Kingdom . |

*Primary Examiner*—Robert P. Olszewski
*Assistant Examiner*—Cheryl L. Gastineau
*Attorney, Agent, or Firm*—Horst M. Kasper

[57] ABSTRACT

Apparatus for gathering particulate material in mines and similar plants has a mobile platform which collects particulate material and surrounds the trailing end of a material removing conveyor. The sides of the trailing end of the conveyor are flanked by plate-like carriers on each of which are fixed several beams serving to push gathered material toward and onto the conveyor in response to movement of the carriers toward the conveyor. The carriers are movable toward and away from the conveyor by motors which are installed beneath the platform, and the apparatus further employs stationary or reciprocable barriers, one behind each beam, which prevent the beams from pushing material away from the conveyor during return strokes of the carriers. Those ends of the beams and barriers which face in the direction of forward movement of the platform slope forwardly and downwardly to facilitate penetration beneath the accumulations of particulate material on the platform.

24 Claims, 3 Drawing Sheets

APPARATUS FOR GATHERING AND REMOVING PARTICULATE MATERIAL

BACKGROUND OF THE INVENTION

The invention relates to improvements in apparatus for gathering and removing particulate material (for example, fragments of rock or coal) in underground excavations, strip mines, quarries and other establishments wherein large quantities of particulate material are to be collected and transported away in a controlled manner.

It is already known to combine a so-called advance working machine or mining machine for collection of coal or other particulate material with a conveyor the trailing end of which is located at the level of a platform or ramp forming part of the machine and serving to gather material which is removed from a mine face and/or is comminuted during forward movement of the machine. The ramp carries several elongated beam-shaped material transferring members which flank the trailing end of the conveyor and are movable relative to the platform in order to shift particulate material along the platform and onto the conveyor for transport in a direction counter to that of forward movement of the machine. The material transferring members have a substantially triangular cross-sectional outline, and each such member has a substantially upright front flank which faces the trailing end of the conveyor and a second flank which slopes downwardly from the upper end of the first flank in a direction away from the trailing end. It is further known to position a stationary barrier behind each material transferring member, i.e., the members approach the adjacent barriers during movement away from the trailing end of the conveyor. Each barrier can constitute a wall or a beam having a cross-sectional outline resembling that of a material transferring member.

An apparatus of the above outlined character is described and shown in published German patent application No. 35 46 192. The apparatus of this published application is designed in such a way that the material transferring members which flank the trailing end of the conveyor are pivotable along the upper side of the platform about vertical shafts at their rear ends (as seen in the direction of forward movement of the machine). The barriers are affixed to the platform, and the latter supports several pivotable material transferring members at each side of the trailing end of the conveyor. This contributes to complexity of the mechanism which is used to pivot the material transferring members. Thus, and since the material transporting members are placed rather close to the upper side of the platform (in order to sweep not only larger but also smaller particles toward and onto the conveyor), they are likely to jam or the prime mover or prime movers which are used to pivot such material transferring members must be designed to apply large forces with attendant consumption of substantial amounts of energy. The situation is analogous when one or more pivotable material transferring members are disposed only at one side of the trailing end of the conveyor. Moreover, the wear upon the shafts and bearings for the material transferring members is quite pronounced, the same as the wear upon the members themselves and upon the motion transmitting mechanism or mechanisms.

Commonly owned published German patent application No. 33 04 908 discloses a somewhat different apparatus wherein elongated material transferring members which flank the trailing end of the conveyor are reciprocable toward and away from the respective sides of the trailing end. The material transferring members have a triangular cross-sectional outline with a steeper flank facing toward and a less inclined flank sloping downwardly away from the respective side of the conveyor. One end of each material transferring member is connected with a reciprocable pusher. This creates problems when particulate material is wedged between the material transferring members and the platform of the advance working machine because the elongated members are subjected to pronounced bending stresses and undergo extensive wear. Furthermore, the means for driving the pushers is located in the region where particulate material gathers on the platform so that such driving means is rapidly contaminated and its parts are subjected to extensive wear as a result of contact with larger and smaller fragments of particulate material.

OBJECTS OF THE INVENTION

An object of the invention is to provide a simple, rugged and efficient apparatus which can gather and transport away large quantities of randomly distributed particulate material per unit of time.

Another object of the invention is to provide an apparatus which is less prone to malfunction and is subject to less wear than heretofore known apparatus.

A further object of the invention is to provide the apparatus with novel and improved means for supporting and moving the material transferring members.

An additional object of the invention is to provide the apparatus with a novel and improved material collecting device.

Still another object of the invention is to provide an apparatus which can be coupled to or incorporated into existing advance working machines for use in mining and related industries.

A further object of the invention is to provide an apparatus whose dimensions can be changed in a simple and time-saving manner to conform such dimensions to the availability of space in an underground excavation, in a strip mine, in a quarry or at any other location where large-scale collection of particulate material is advisable or necessary.

Another object of the invention is to provide an apparatus whose operation can be automated to any desired extent and wherein the motor or motors and/or other sensitive parts are less exposed to dust and/or other contaminants than in heretofore known apparatus.

An additional object of the invention is to provide an apparatus wherein the material transferring members are subjected to less pronounced bending and/or other stresses than in conventional apparatus.

A further object of the invention is to provide a novel and improved method of efficiently gathering and transporting away large quantities of randomly distributed particulate material, such as coal, in underground excavations or in plants which are set up and operate above the ground.

Another object of the invention is to provide an apparatus wherein a single prime mover can be used to drive a large number of material transferring members.

SUMMARY OF THE INVENTION

The invention is embodied in an apparatus which can be utilized as a means for gathering and removing particulate material, such as coal in an underground excavation. The apparatus comprises a material collecting device which can constitute the platform or ramp of an underground advance working machine and on which particulate material gathers as a result of removal from a mine face or as a result of forward movement of the advance working machine into a vein of ore or the like. The improved apparatus further comprises a conveyor (e.g., an endless belt, chain or bucket conveyor) which serves to transport particulate material in a predetermined direction (preferably counter to the direction of forward movement of the advance working machine) and has a receiving portion which is adjacent the collecting device. The receiving portion can constitute the rear or trailing end of the conveyor. The apparatus also comprises means for transferring particulate material from the collecting device onto the receiving portion of the conveyor, and such transferring means comprises at least one elongated material transferring member which is disposed above the collecting device at one side of the receiving portion of the conveyor. The at least one material transferring member has a substantially upright first flank which faces the receiving portion of the conveyor and a second flank which slopes downwardly from the upper end of the first flank away from the receiving portion. The transferring means further comprises means for moving the at least one material transferring member (hereinafter called at least one member for short) forwardly and backwards toward and away from the receiving portion of the conveyor so that the first flank is compelled to push particulate material which is located in front of it toward the receiving portion during forward movement and that the material can slide onto and over the second flank during backward movement of the at least one member. In accordance with a presently preferred embodiment, the moving means for the at least one member comprises a substantially plate-like carrier which overlies the collecting device and is rigid with the at least one member, and means (hereinafter called shifting means) for moving the carrier. Still further, the apparatus comprises means for preventing the at least one member from pushing material away from the receiving portion of the conveyor during backward movement of the at least one member with the carrier (i.e., for compelling particulate material behind the at least one member to slide onto and over the second flank during backward movement of the at least one member). The preventing means comprises at least one elongated barrier which overlies the carrier, and the carrier is movable relative to such barrier. The at least one member is disposed between the at least one barrier and the receiving portion of the conveyor. Not only the at least one member but also the at least one barrier extends or can extend in parallelism with the predetermined direction.

The at least one member has a substantially triangular cross-sectional outline, the same as the at least one barrier. The arrangement is or can be such that the cross-sectional outline of the barrier resembles or matches the cross-sectional outline of the at least one member. Alternatively, the at least one barrier can include a wall which extends above the collecting device behind the at least one member.

The end portions of the at least one elongated barrier extend beyond the carrier (in and counter to the predetermined direction) and can be affixed directly to the collecting device. Alternatively, the apparatus can further comprise means for moving the at least one barrier toward the receiving portion of the conveyor while the carrier is being shifted away from the receiving portion and for moving the at least one barrier away from the receiving portion while the carrier moves toward the receiving portion. This renders it possible to shorten the forward and rearward strokes of the at least one member.

The collecting device can include a substantially plate-like cover or top wall which is located beneath the carrier. The cover includes at least portions which are exposed by the carrier when the latter completes its backward and its forward movement.

The front edge of the carrier (namely the edge which confronts the one side of the receiving portion of the conveyor) is preferably adjacent the first flank of the at least one member.

The cover can be provided with at least one opening, and the means for shifting the carrier can include guide means beneath the cover, follower means movable along the guide means and extending through the at least one opening of the cover and being affixed to the underside of the carrier, and displacing means for moving the follower means along the guide means. The guide means can comprise a plurality of elongated parallel guide elements, and the follower means can comprise a plurality of slides each of which is movable along one of the guide elements. The follower means preferably further comprises a plate which is connected with the slides, a first coupling provided at the underside of the plate to connect the latter with the displacing means, and a second coupling provided at the upper side of the plate, extending through the at least one opening of the cover and connecting the plate with the carrier. The guide elements can include elongated rods, and the slides can include sleeves which slidably surround the respective rods. Each sleeve can be provided with one or more internal linings of TEFLON (Trademark) or other suitable friction reducing material. Furthermore, the sleeves can be equipped with stripping rings which serve to remove impurities (such as dust and/or fragments of particulate material) from the external surfaces of the respective rods in response to movement of the sleeves along the rods. The displacing means can comprise a prime mover (e.g., a fluid-operated motor) in the collecting device beneath the cover. The aforementioned follower means serves to transmit motion from the output element (e.g., a reciprocable piston rod) of the displacing means to the carrier. As mentioned above, such follower means or motion transmitting means extends through the at least one opening of the cover which forms part of the collecting device.

Those end portions of the at least one member and of the at least one barrier which overlie the collecting device preferably slope downwardly counter to the predetermined direction. This is desirable and advantageous if the collecting device forms part of the aforediscussed advance working machine which is operable to move counter to the predetermined direction; the downwardly sloping end portions of the at least one member and of the at least one barrier offer little resistance to movement of the mining counter to the direction of transport of particulate material by the conveyor.

The collecting device can be assembled of two or more discrete sections and of means for preferably separably coupling the sections to each other. This renders it possible to vary the size of the collecting device, e.g., in dependency upon the availability of space in an underground excavation. That (first) section which is adjacent the one side of the receiving portion of the conveyor preferably at least partially confines the means for shifting the carrier and the at least one member relative to the at least one barrier and the cover of the collecting device.

The material transferring means can be assembled of two halves which are or can be mirror images of each other with reference to a vertical plane which halves the receiving portion of the conveyor and extends in the predetermined direction. Such material transferring means further comprises at least one additional elongated material transferring member which is disposed above the collecting device at the other side of the receiving portion of the conveyor and substantially opposite the at least one member. The at least one additional member also includes a substantially upright first flank which faces the receiving portion and a second flank which slopes downwardly from the upper end of the first flank away from the receiving portion. The transferring means further comprises means for moving the at least one additional member forwardly and backwards toward and away from the receiving portion so that the first flank of the at least one additional member pushes particulate material which is located in front of it toward the receiving portion during forward movement of the at least one additional member and that particulate material can slide onto and over the second flank of the at least one additional member during backward movement of the at least one additional member. The means for moving the at least one additional member comprises a substantially plate-like additional carrier which is rigid with the at least one additional member and overlies the collecting device, and means for shifting the additional carrier. Such apparatus further comprises means for preventing the at least one additional member from pushing material away from the receiving portion of the conveyor during backward movement with the additional carrier, and such preventing means comprises at least one additional barrier which overlies the additional carrier. The additional carrier is movable relative to the at least one additional barrier and the at least one additional member is disposed between the receiving portion and the at least one additional barrier.

One of the shifting means for the carriers can include a prime mover (such as the aforementioned fluid-operated motor) and means for transmitting motion from the prime mover to the other shifting means. Such motion transmitting means is preferably disposed beneath the receiving portion of the conveyor and can include at least one chain transmission or at least one linkage.

The aforementioned prime mover and the motion transmitting means can be used to synchronize the movements of the at least one member with the movements of the at least one additional member in such a way that the at least one member moves toward the receiving portion of the conveyor when the at least one additional member moves away from the receiving portion and vice versa. However, it is equally within the purview of the invention to provide each of the shifting means with a discrete prime mover and to synchronize the operation of the two prime movers or to operate the two prime movers in such a way that the at least one additional member moves toward the receiving portion of the conveyor simultaneously with the at least one additional member.

The transferring means can comprise a second material transferring member which is spaced apart from the at least one member the at least one additional member and is also affixed to the carrier for the at least one member or to the additional carrier. The preventing means then comprises a second barrier and the carrier for the second member is movable relative to the second barrier. The at least one barrier or the at least one additional barrier is then disposed between the second member and the at least one member or the at least one additional member. The second member of such apparatus is disposed between the at least one barrier and the second barrier or between the second barrier and the at least one additional barrier.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

DESCRIPTION OF PREFERRED EMBODIMENTS

The apparatus which is shown in the drawing comprises a material collecting device 1 which constitutes the platform or ramp of a mining machine for use in an underground excavation, in a strip mine, in a quarry or at any other locale where large quantities of comminuted solid particulate material (such as coal rock) must be gathered and removed in a predictable manner. The collecting device 1 (hereinafter called platform for short) cooperates with an endless belt, chain or other suitable conveyor 2 having a receiving portion 2a constituting its rear or trailing end and serving to receive particulate material from the platform. The platform 1 is affixed to the other part (not shown) of the advance working machine by hinges 3 which enable the platform to change its orientation with reference to a substantially horizontal axis extending at right angles to the direction (arrow 104) of transport of particulate material which has been transferred onto the receiving portion 2a. The platform 1 can be inclined to act as a large shovel when the working machine is set in motion to advance counter to the direction which is indicated by the arrow 104. At such time, the platform 1 collects pieces of rock or ore which have accumulated on the ground. In addition, the platform 1 intercepts and gathers particulate material which descends onto its top wall or cover while the working machine is in motion or at a standstill.

Figure 1:
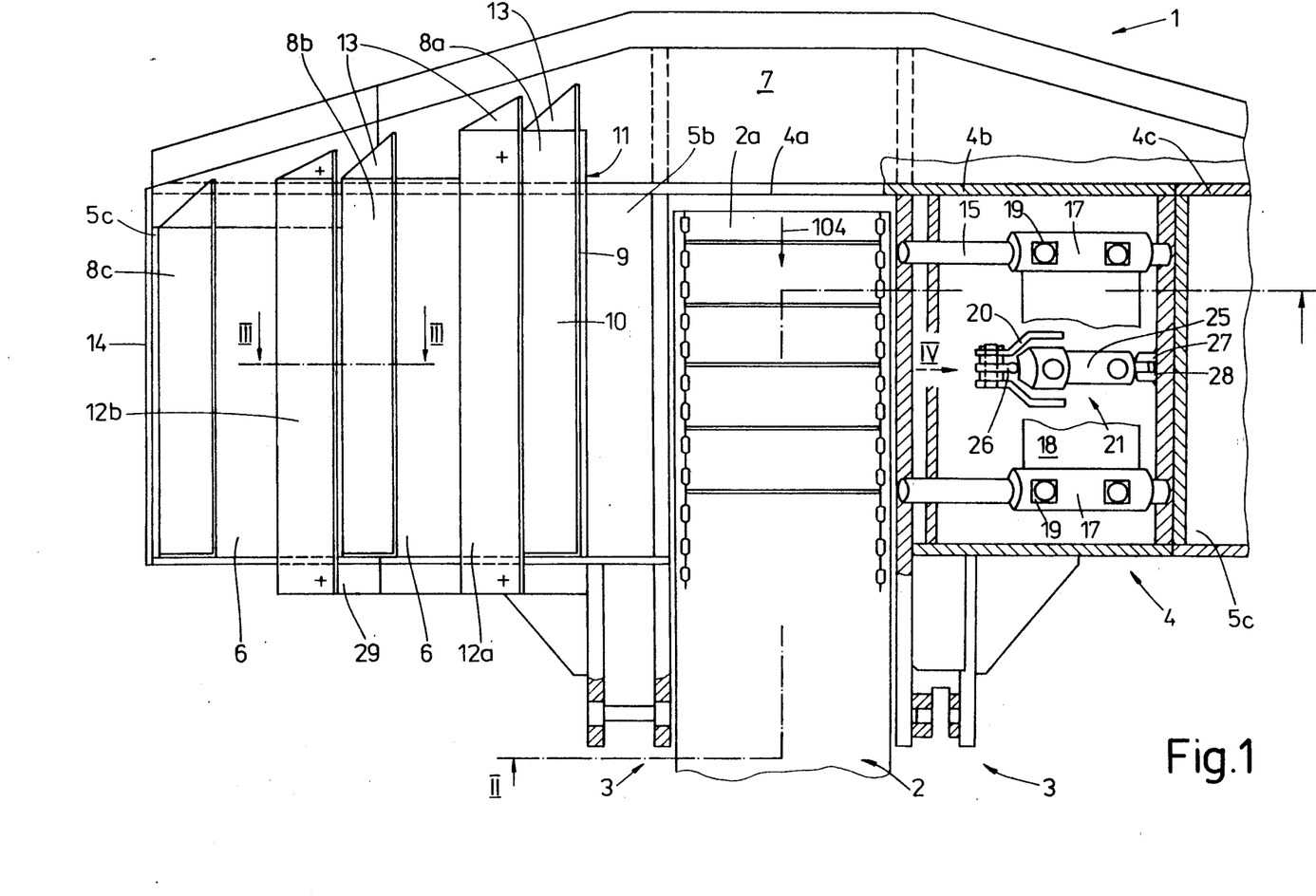
FIG. 1 is a fragmentary schematic partial plan and partial horizontal sectional view of an apparatus which embodies one form of the invention, with the section taken along the line I—I in FIG. 2 as seen in the direction of arrows.
Figure 2:
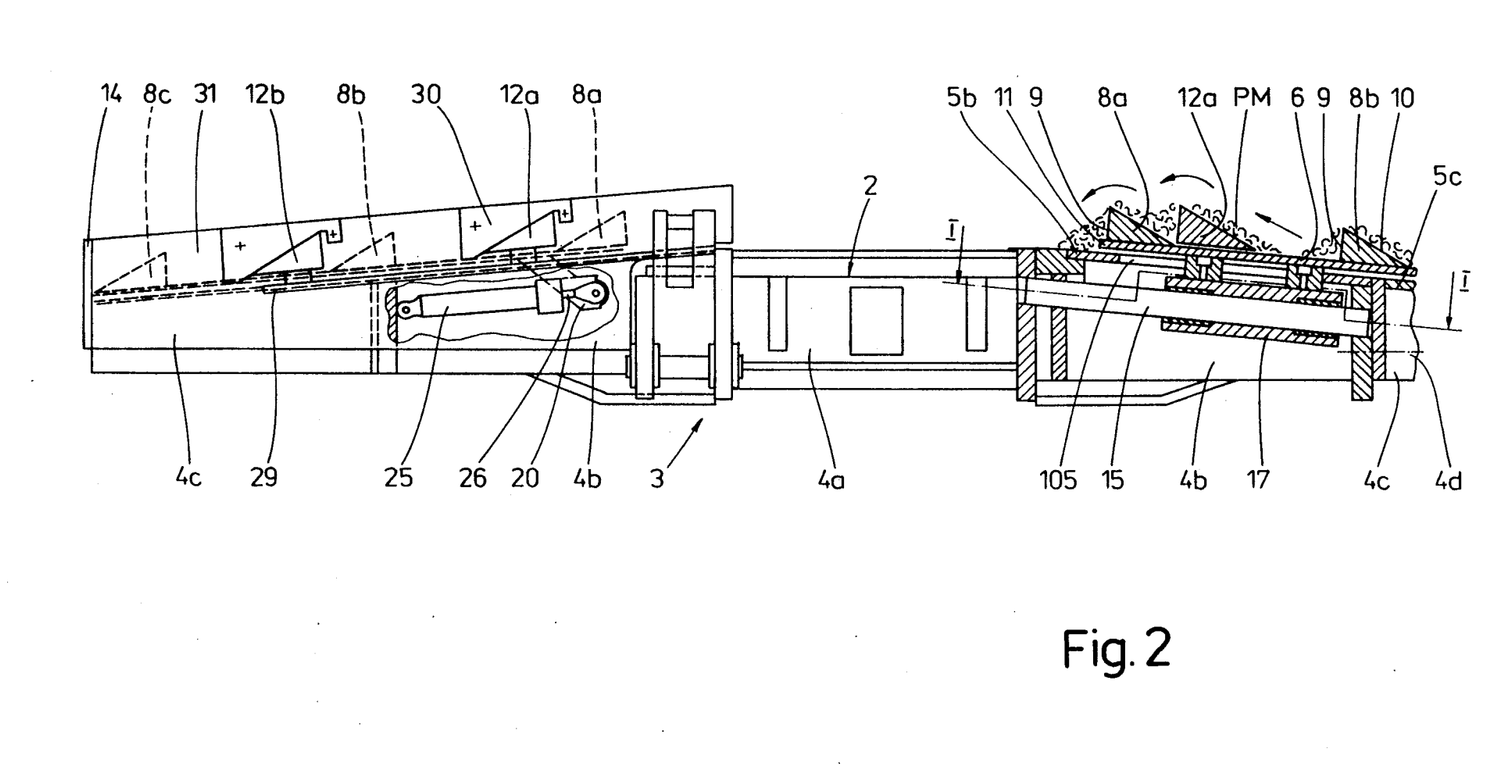
FIG. 2 is a fragmentary transverse vertical sectional view substantially as seen in the direction of arrows from the line II—II in FIG. 1.

The illustrated platform 1 comprises a preferably rugged frame or casing 4 which includes a median or central section 4a, two right-hand sections 4b, 4c (as seen in FIG. 1 or 2) and two left-hand sections 4b, 4c which are or can be mirror images of the right-hand sections with reference to a vertical symmetry plane extending in the direction of arrow 104 and halving the conveyor 2. Each section 4b is preferably separably coupled to the section 4a as well as to the adjacent section 4c, e.g., by bolts and nuts or other suitable coupling elements one of which is indicated in FIG. 1 by a phantom line 4d. The feature that the frame 4 of the platform 1 is assembled of several discrete separable sections is desirable and advantageous because this renders it possible to increase or reduce the overall size of the platform depending upon the availability of space (e.g., in an underground excavation) or upon the area in which particulate material is to be collected for transfer onto the receiving portion 2a of the conveyor 2.

The frame 4 of the platform 1 comprises covers including those shown at 5b and 5c and forming part of the respective sections 4b, 4c. The means for transferring particulate material onto the receiving portion 2a of the conveyor 2 is or can be assembled of two halves which are mirror symmetrical to each other with reference to the aforementioned vertical plane extending in the direction of arrow 104 and halving the conveyor 2. Therefore, only one-half of such transferring means is shown in full detail. The right-hand half (hereinafter called transferring unit) of the transferring means comprises a total of three substantially parallel elongated material transferring members in the form of beams 8a, 8b and 8c each of which has a substantially triangular cross-sectional outline with a steep (substantially upright) first or front flank 9 facing toward the receiving portion 2a of the conveyor 2 and with a less steeply inclined second or rear flank 10 which slopes downwardly from the upper end of the respective first flank 9 in a direction away from the receiving portion 2a. The latter is disposed between the two halves of the transferring means, i.e., the three beams 8a-8c of one transferring unit are located at one side and the three beams 8a-8c of the other transferring unit are located at the other side of the receiving portion 2a opposite the one unit. The beams 8a-8c of each of the two sets or groups are movable as a unit forwardly (toward the receiving portion 2a) and backwards (i.e., away from the receiving portion). The means for moving each set of beams 8a-8c comprises a discrete plate-like carrier 6 which is located above and is movable along the upper sides of the covers 5b, 5c of the respective sections 4b and 4c of the frame 4. The beams 8a-8c of each set are affixed to the respective carrier 6 at each of their ends to ensure that they are subjected to negligible bending stresses during movement toward the receiving portion 2a of the conveyor 2, namely during transfer of particulate material toward the receiving portion 2a. For example, the end portions of the beams 8a-8c can be welded and/or bolted and/or riveted to the respective carriers 6.

The upper side of the substantially wedge-like portion 7 of the platform 1 behind the two carriers 6 (as seen in the direction of arrow 104) is preferably flush or substantially flush with the upper sides of the carriers. This facilitates the transport of rows or strips of particulate material toward the receiving portion 2a when the carriers 6 are in motion, and more particularly while the carriers are caused to move toward the receiving portion 2a.

The beams 8a-8c may but need not be hollow. The drawing shows solid beams which can stand long periods of use without bending, buckling or other undesirable deformation. Each carrier 6 has a front edge 11 which is immediately adjacent the upper sides of the covers 5b, 5c of the respective sections 4b, 4c and is flush or nearly flush with the steep front flank 9 of that beam (8a) which is nearest to the collecting portion 2a of the conveyor 2. The covers 5b of the sections 4b have elongated openings 105 (e.g., in the form of slots extending at right angles to the direction which is indicated by the arrow 104) in order to provide room for portions of followers 16 forming part of means for shifting the carriers 6 in directions toward and away from the receiving portion 2a. The openings 105 are permanently overlapped by the respective carriers 6 in order to prevent penetration of particulate material and/or dust and/or other contaminants into the spaces for the shifting means. Each carrier 6 exposes a portion of the respective cover 5c during forward movement toward the receiving portion 2a and overlies such portion of the respective cover 5c during return movement away from the receiving portion 2a. Thus, each cover 5b and 5c cooperates with the respective carrier 6 to prevent penetration of particulate material into the interior of the platform 1.

Each transferring unit further comprises means for preventing the respective set of beams 8a-8c from pushing particulate material in a direction away from the receiving portion 2a of the conveyor 2. Such preventing means comprises a pair of elongated beam-shaped barriers 12a, 12b at each side of the conveyor 2 and a barrier in the form of a wall 14 behind the rearmost beam 8c. Each barrier 12a is disposed between the respective beams 8a, 8b, and each barrier 12b is disposed between the respective beams 8b, 8c. The undersides of the barriers 12a, 12b are closely adjacent the upper sides of the respective carriers 6, and the end portions of each of the four barriers 12a, 12b are bolted, riveted, welded to otherwise fixedly secured to the platform 1. The illustrated barriers 12a, 12b are parallel or nearly parallel to the respective sets of beams 8a-8c, and the cross-sectional configuration of each of the barriers 12a, 12b can approximate or match that of any one of the beams 8a-8c. This can be readily seen in FIG. 3. Thus, each of the barriers 12a, 12b also comprises a steep front flank which faces toward the receiving portion 2a of the conveyor 2 and a less inclined second flank which slopes from the upper end of the first flank in a direction away from the receiving portion 2a. The rearmost barriers or walls 14 can constitute integral or separable parts of the platform 1.

FIG. 1 shows that the length of the beams 8a exceeds the length of the beams 8b and that the length of the beams 8b exceeds the length of the beams 8c. The barriers 12a are longer than the barriers 12b, and the walls 14 are shorter than the barriers 12b.

The connections between the front end portions of the barriers 12a, 12b and the platform 1 are shown at 29. The connections between the rear end portions 13 of the barriers 12a, 12b and the wedge-like portion 7 of the platform 1 can be similar to or identical with those which are shown at 29. In addition, the end portions 13 of the barriers 12a, 12b and the adjacent end portions of the beams 8a–8c (also denoted by characters 13) preferably slope downwardly counter to the direction which is indicated by the arrow 104. This ensures that the end portions 13 offer little resistance to advancement of the working machine in an excavation counter to the direction of arrow 104.

Sheet metal plates 30 are provided to close or seal cutouts or recesses in the rear wall 31 of the platform 1.

Figure 3:
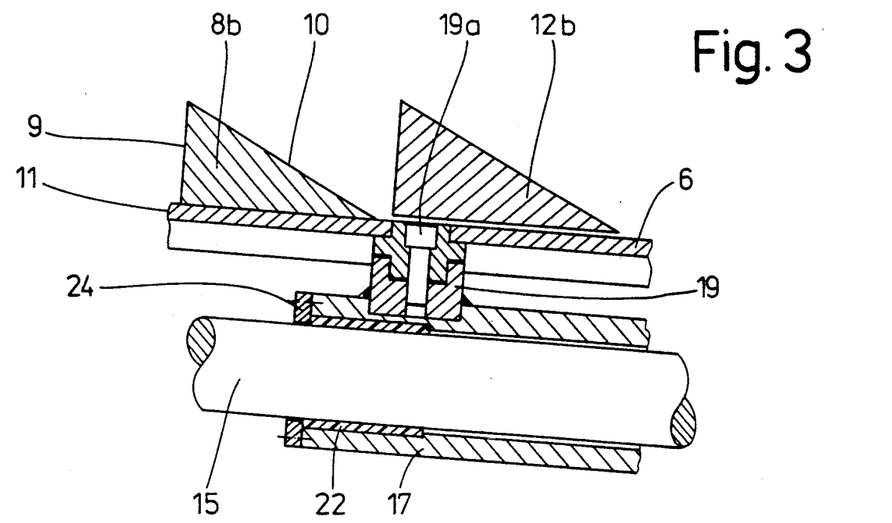
FIG. 3 is an enlarged fragmentary vertical sectional view as seen in the direction of arrows from the line III—III in FIG. 1.
Figure 4:
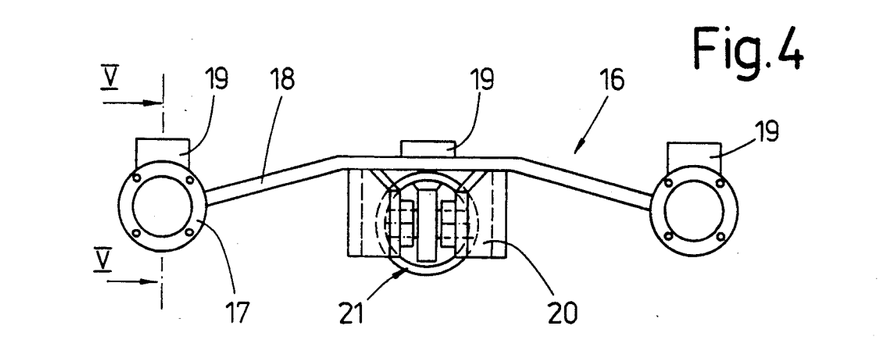
FIG. 4 is an enlarged front elevational view of a follower substantially as seen in the direction of arrow IV in FIG. 1.

The means for shifting the carriers 6 toward and away from the receiving portion 2a of the conveyor 2 comprises guide means in the form of pairs of parallel rod-like guide elements 15 which are installed in the platform 1 beneath the respective covers 5b and extend substantially at right angles to the longitudinal direction of the conveyor 2. The shifting means further include motion transmitting means in the form of the aforementioned followers 16 each of which receives motion from a discrete displacing device 25, e.g., a fluid-operated (preferably hydraulic) cylinder and piston unit in the respective section 4b of the frame 4 of the platform 1. Each follower 16 comprises two slides in the form of sleeves 17 which surround and are movable along the respective rod-shaped guide elements 15 toward and away from the receiving portion 2a. Each follower 16 also comprises a substantially plate-like element 18 (hereinafter called plate) which is rigid with the respective sleeves 17, the underside of which carries a first coupling 21 for attachment to the output element of the respective motor 25, and the upper side of which carries at least one second coupling 19 extending through the opening 105 of the adjacent cover 5b and connected to the underside of the respective carrier 6. As can be seen in FIG. 3, each coupling 19 can comprise two complementary studs one of which is welded or otherwise affixed to the plate 18 and the other of which is welded or otherwise affixed to the carrier 6. The two studs are held together by a bolt or screw 19a. The utilization of a pair of interfitted studs renders it possible to reduce shearing stresses upon the bolt or screw 19a. Each coupling 21 comprises two spaced-apart lugs 20 at the underside of the respective plate 18 and a pin which articulately connects such lugs to a lug 26 on the piston rod of the respective motor 25.

Figure 5:
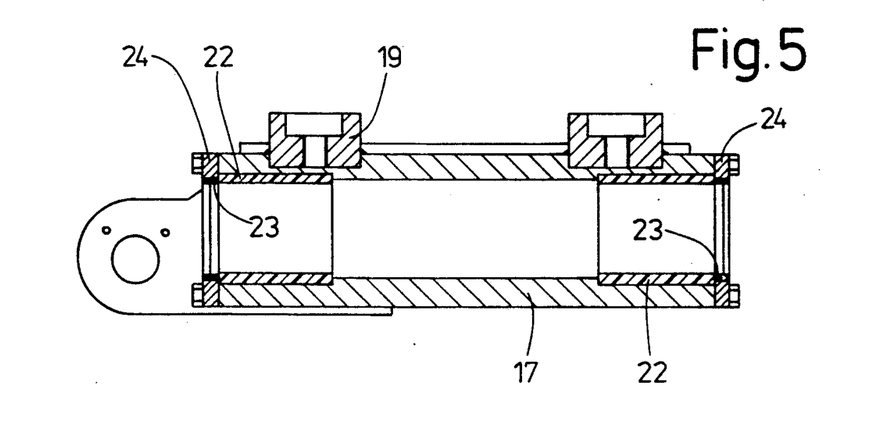
FIG. 5 is an enlarged transverse vertical sectional view as seen in the direction of arrows from the line V—V in FIG. 4.

The sleeves 17 are preferably provided with internal linings 22 (FIG. 5) of friction reducing (preferably self-lubricating) material, such as TEFLON (Trademark). In addition, each end portion of each sleeve 17 can be provided with a stripping ring 23 which prevents dust and/or other impurities from entering the respective sleeve 17 while the latter is in motion along the corresponding guide element 17. The stripping rings 23 are held in requisite positions by annular supporting elements 24 which are affixed to the respective ends of the sleeves 17.

The cylinders of the motors 25 are articulately connected to the respective sections 4b of the frame 4 by horizontal pivot members journalled in pairs of lugs 27, 28. The lugs 26 at the free ends of piston rods of the motors 25 are articulately connected to the lugs 20 at the underside of the respective plate 18. Each lug 26 can form part of a linkage which connects the piston rod (output element) of the respective motor 25 with the corresponding plate 18, i.e., with the respective carrier 6.

The operation of the improved apparatus is as follows:

Particulate material (some particulate material is shown at PM in the right-hand portion of FIG. 2) descends onto or is picked up from the ground by the platform 1 while the working machine is in motion and/or while the machine is at a standstill. Some particulate material descends onto the portion 7 to be automatically advanced onto the carriers 6 when the working machine is in motion in a direction counter to that indicated by the arrow 104. Additional particulate material descends directly onto the carriers 6 and/or onto the exposed portions of the covers 5b and/or 5c. The motors 25 are on to shift the respective carriers 6 back and forth toward and away from the respective sides of the collecting portion 2a. During each forward movement, the steep front flanks 9 of the foremost beams 8a push the particulate material in front of them toward the receiving portion 2a. At the same time, the front flank 9 of each beam 8b pushes particulate material in front of it toward and onto the sloping second or rear flank of the adjacent stationary barrier 12a, and the front flank 9 of each rearmost beam 8c causes particulate material in front of it to advance onto and beyond the gradually sloping second or rear flank of the adjacent barrier 12b.

When the carriers 6 move away from the collecting portion 2a, the steep front flanks of the barriers 12a prevent particulate material in front of them from moving backwards in response to retraction of the beams 8a; instead, the material which is located in front of the barriers 12a is caused to slide onto and over the second flanks 10 of the beams 8a so that such material accumulates in front of the front flanks 9 of the beams 8a to be pushed toward the collecting portion 2a during the next forward strokes of the respective carriers 6. Analogously, the stationary barriers 12b cause particulate material in front of them to ride over and beyond the adjacent beams 8b while these beams move away from the collecting portion 2a, and the barriers or walls 14 cause particulate material in front of them to ride over the retreating beams 8c. As the carriers 6 continue to move back and forth toward and away from the conveyor portion 2a, the latter receives a certain quantity of particulate material from the foremost beams 8a during each forward stroke of the respective carriers. In other words, rows or files of particulate material are fed toward the receiving portion 2a in stepwise fashion.

It is clear that only one of the motors 25 will be set in operation if only one half of the platform 1 receives particulate material while the working machine is in motion or while the machine is at a standstill.

FIG. 2 shows that the length of the forward and return strokes of the carriers 6 and the distances between neighboring barriers 12a, 12b, 14 at each side of the conveyor 2 can be selected with a view to ensure that the second flank 10 of the foremost beam 8a is immediately or closely adjacent the front or first flank of the barrier 12a in retracted position of the respective carrier 6, that the second flank 10 of the beam 8b is then closely or immediately adjacent the first flank of the respective barrier 12b, and that the second flank 10 of the rearmost beam 8c is closely or immediately adjacent the respective barrier or wall 14. This enhances the output of the material transferring means and reduces the likelihood of stagnation of certain batches of particulate material on the platform 1.

An important advantage of the improved apparatus is that a single carrier 6 suffices to move two, three or more beams at the one or the other side of the conveyor 2. Moreover, both ends of each beam or the whole beam along its length can be rigidly secured to the respective carrier 6 to thus greatly or totally prevent undesirable bending and/or other stressing of the beams when the apparatus is in actual use to transfer particulate material from the platform 1 onto the conveyor 2. The beams 6 need not perform any pivotal movements which is desirable and advantageous because the beams thereon are less likely to jam.

Another important advantage of the improved apparatus is that all parts of the means for moving the carriers 6 beams 8a–8c relative to the platform 1 and relative to the respective barriers 12a, 12b, 14 are or can be adequately concealed and shielded in the interior of the platform 1 beneath the covers 5b, 5c and platform portion 7. This reduces the likelihood of malfunction and prolongs the useful life of the motors and motion transmitting means for the carriers 6. All that is necessary is to provide the covers 5b with openings 105 for portions of the followers 16 (motion transmitting means) which are driven by the motors 25 and move the respective carriers 6. The openings 105 are overlapped by the respective carriers 6 to thus greatly reduce the likelihood or to eliminate the possibility of penetration of smaller fragments of particulate material and/or dust and/or other foreign matter into the spaces for the parts which move the carriers 6 along the paths defined by the respective guide elements 15.

An advantage of the barriers 12a, 12b (which are or can be fixedly secured to the platform 1) is that these barriers normally support a certain quantity of particulate material PM (see FIG. 2) during each stage of operation of the improved apparatus so that such material need not be borne by and cannot contribute to the inertia of carriers 6 when the motors 25 are on to move the carriers back and forth toward and away from the respective sides of the conveyor 2. In other words, the barriers 12a, 12b render it possible to reduce the energy requirements of the motors 25 for the carriers 6.

An advantage of the front edges 11 of the carriers 6 is that such front edges assist the foremost or innermost beams 8a in advancing large quantities of particulate material onto the receiving portion 2a of the conveyor 2 whenever the carriers are compelled to perform their forward strokes. Moreover, the front edges 11 sweep the particulate material off the upper sides of the covers 5b so that particulate material is even less likely to penetrate into the openings 105. These openings are preferably rather large in order to facilitate attachment of the carriers 6 to the respective followers 16 or separation of the carriers 6 for the purposes of inspection, repair or replacement.

The improved apparatus can be modified in a number of ways without departing from the spirit of the invention. For example, it is possible to provide the apparatus with means for moving the barriers 12a, 12b relative to the adjacent beams 8a–8c, preferably in such a way that the barriers 12a, 12b move toward the receiving portion 2a of the conveyor 2 while the respective beams 8a–8c move away from the receiving portion and vice versa. Reference may be had to the aforediscussed commonly owned published German patent application No. 33 04 908 which describes suitable moving means, i.e., means which can be used in the apparatus of the present invention to drive the barriers 12a, 12b relative to the adjacent beams 8a–8c. The utilization of moving barriers contributes to the output of the apparatus. Nevertheless, it is presently preferred to provide the improved apparatus with fixedly mounted barriers 12a, 12b because this contributes to simplicity and reliability and longer useful life of the apparatus.

It is further possible to replace the illustrated fluid-operated motors 25 with other types of prime movers. For example, the apparatus can employ one or more hydraulic, electric or other motors which transmit motion to the carriers 6 by way of cranks, eccentrics or like motion transmitting means.

Though the drawing shows that each of the two carriers 6 receives motion from a discrete motor 25, it is equally within the purview of the invention to employ a single motor and to provide a suitable motion transmitting mechanism (e.g., one or more chain transmissions or one or more linkages). The single motor can be operatively connected with one of the carriers 6, e.g., in a manner as described hereinabove, and the motion transmitting mechanism is then used to transmit motion from such single motor to the other carrier. The arrangement may be such that the motion transmitting mechanism synchronizes the movements of the two carriers 6, either to move both carriers simultaneously toward or away from the respective sides of the conveyor 2 or to move one of the carriers toward the conveyor while the other carrier moves away from the conveyor and vice versa. Of course, the operation of the two motors 25 which are used in the illustrated apparatus can also be synchronized to ensure that the two carriers 6 move jointly toward and away from the conveyor 2 or that the carriers move simultaneously but in the same direction (i.e., one of the carriers moves toward the conveyor while the other carrier moves away from the conveyor, and vice versa).

If the apparatus employs a single motor or another single prime mover in conjunction with the aforementioned motion transmitting mechanism, the motion transmitting mechanism is preferably disposed beneath the conveyor 2, e.g., beneath the receiving portion 2a. This reduces the likelihood of rapid contamination of the motion transmitting mechanism. The design of such motion transmitting mechanism can be simplified if it is designed to ensure that the two carriers 6 always move in the same direction (i.e., that one of the carriers moves toward the conveyor 2 when the other carrier moves away from the conveyor and the other way around).

The apparatus can be simplified by replacing the illustrated composite (multiple-section) platform 1 with a simpler platform which is made of one piece or employs a frame which is assembled of a smaller number of sections. The illustrated design is preferred at this time because it renders it possible to conform the dimensions of the platform 1 to the dimensions of the space which is available for the improved apparatus. The motors 25 are preferably mounted in the sections 4b, i.e., in the sections which are immediately adjacent the conveyor 2, so that such motors need not be transferred and/or otherwise manipulated when the persons in charge decide to change the dimensions of the platform 1. The platform 1 need not consist of two mirror symmetrical halves. For example, it is possible to provide two sections 4b, 4c and one side and one, three or more sections at the other side of the receiving portion 2a of the conveyor.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. Apparatus for gathering and removing particulate material comprising a material collecting device;
   a conveyor arranged to transport particulate material in a predetermined direction and having a receiving portion adjacent said collecting device;
   means for transferring particulate material from said collecting device onto said receiving portion, comprising at least one elongated material transferring member disposed above said collecting device at one side of said receiving portion, said at least one member having a substantially upright first flank facing said receiving portion and a second flank sloping downwardly from said first flank away from said receiving portion, and means for moving said at least one member forwardly and backwards toward and away from said receiving portion so that said first flank pushes material which is located in front of it toward said receiving portion during forward movement and that material can slide onto and over said second flank during backward movement of said at least one member, said moving means including a substantially plate-like carrier on which the said at least one member is fixed the carrier overlying said collecting device and means for shifting said carrier; and means for preventing at least one member from pushing material away from said receiving portion during backward movement with said carrier, including at least one barrier overlying said carrier, said carrier being movable relative to said at least one barrier and said at least one member being disposed between receiving portion and said at least one barrier.

2. The apparatus of claim 1, wherein said collecting device includes a platform of an advance working machine and said conveyor has a rear end including said receiving portion, said at least one member having a substantially triangular cross-sectional outline.

3. The apparatus of claim 1, wherein said at least one member has a substantially triangular cross-sectional outline and said at least one barrier has a cross-sectional outline which at least resembles the cross-sectional outline of said at least one member.

4. The apparatus of claim 1, wherein said at least one barrier includes a wall.

5. The apparatus of claim 1, wherein said at least one barrier is elongated and includes two end portions extending beyond said carrier and affixed to said collecting device.

6. The apparatus of claim 1, wherein said collecting device includes a substantially plate-like cover beneath said carrier, said cover including a portion which is exposed by said carrier when the carrier completes its backward movement and another portion which is exposed when the carrier completes its forward movement.

7. The apparatus of claim 1, wherein said carrier has a front edge adjacent the first flank of said at least one member.

8. The apparatus of claim 1, wherein said collecting device includes a cover beneath said carrier, said cover having at least one opening and said shifting means comprising guide means disposed beneath said cover, follower means movable along said guide means and extending through said at least one opening and affixed to said carrier, and displacing means for moving said follower means along said guide means.

9. The apparatus of claim 8, wherein said guide means comprises a plurality of parallel elongated guide elements and said follower means comprises a plurality of slides each movable along a discrete guide element and a plate connected with said slides, said plate having an underside and an upper side and said follower means further comprising at least one first coupling provided at said underside and connecting said plate with said displacing means and at least one second coupling provided at said upper side, extending through said at least one opening and connecting said plate with said carrier.

10. The apparatus of claim 9, wherein said guide elements include rods and said slides include sleeves which slidably surround the respective rods.

11. The apparatus of claim 10, wherein said sleeves have internal linings of friction reducing material.

12. The apparatus of claim 10, wherein said sleeves comprise stripping rings arranged to remove impurities from the respective rods in response to movement of said sleeves along such rods.

13. The apparatus of claim 1, wherein said collecting device includes a substantially plate-like cover adjacent and beneath said carrier, said cover having at least one opening and said shifting means comprising a prime mover in said collecting device beneath said cover and means for transmitting motion from said prime mover to said carrier, said motion transmitting means extending through said at least one opening.

14. The apparatus of claim 13, wherein said prime mover comprises a fluid-operated motor.

15. The apparatus of claim 1, wherein said at least one member and said at least one barrier have end portions overlying said collecting device and sloping downwardly counter to said direction.

16. The apparatus of claim 1, wherein said collecting device comprises a plurality of discrete sections and means for separably coupling said sections to each other, said sections including a first section which is adjacent said one side of said receiving portion and said shifting means being disposed in said first section.

17. The apparatus of claim 1, wherein said transferring means further comprises at least one additional elongated material transferring member disposed above said collecting device at the other side of said receiving portion substantially opposite said at least one member, said at least one additional member having a substantially upright first flank facing said receiving portion and a second flank sloping downwardly from said first flank away from said receiving portion, and means for moving said at least one additional member forwardly and backwards toward and away from said receiving portion so that said first flank of said at least one additional member pushes material which is located in front of it toward said receiving portion during forward movement and that material can slide onto and over said second flank of said at level one additional member during backward movement of said at least one additional member, said means for moving said at least one additional member including a substantially plate-like additional carrier on which said additional member is fixed, the carrier overlying said collecting device and means for shifting said additional carrier, and further comprising means for preventing said at least one additional member from pushing material away from said receiving portion during backward movement with said additional carrier including at least one additional carrier including at least one additional barrier overlying said additional carrier, said additional carrier being movable relative to said at least one additional barrier and said at least one additional member being disposed between said receiving portion and said at least one additional barrier.

18. The apparatus of claim 17, wherein one of said shifting means includes a prime mover and means for transmitting motion from said prime mover to the other of said shifting means.

19. The apparatus of claim 18, wherein said motion transmitting means is disposed beneath said receiving portion.

20. The apparatus of claim 18, wherein said motion transmitting means comprises at least one chain transmission.

21. The apparatus of claim 18, wherein said motion transmitting means comprises at least one linkage.

22. The apparatus of claim 17, further comprising means for synchronizing the movements of said at least one member with the movements of said at least one additional member so that said at least one member moves toward said receiving portion when said at least one additional member moves away from said receiving portion and that said at least one member moves away from said receiving portion when said at least one additional member moves toward said receiving portion.

23. The apparatus of claim 1, wherein said transferring means comprises a second transferring member spaced apart from said at least one member and affixed to said carrier, said preventing means comprising a second barrier and said carrier being movable relative to said second barrier, said at least one barrier being disposed between said at least one member and said second member and said second member being disposed between said barriers.

24. The apparatus of claim 1, wherein the particulate material is coal.

* * * * *